(12) United States Patent
Fuse et al.

(10) Patent No.: US 7,993,007 B2
(45) Date of Patent: Aug. 9, 2011

(54) PROJECTOR

(75) Inventors: Makoto Fuse, Matsumoto (JP);
Kazuhiro Nishida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 713 days.

(21) Appl. No.: 12/109,559

(22) Filed: Apr. 25, 2008

(65) Prior Publication Data
US 2008/0266527 A1    Oct. 30, 2008

(30) Foreign Application Priority Data
Apr. 25, 2007   (JP) ................. 2007-115141

(51) Int. Cl.
*G03B 21/14* (2006.01)
(52) U.S. Cl. .............. 353/38; 353/32; 359/649
(58) Field of Classification Search ............ 353/32, 353/38; 359/649–651
See application file for complete search history.

(56) References Cited

U.S. PATENT DOCUMENTS

| | | | |
|---|---|---|---|
| 7,128,420 B2 * | 10/2006 | Kapellner et al. | 353/38 |
| 7,232,223 B2 * | 6/2007 | Koide | 353/20 |
| 7,245,429 B2 * | 7/2007 | Yoshikawa et al. | 359/460 |
| 7,322,700 B2 * | 1/2008 | Miyagaki et al. | 353/31 |
| 7,382,539 B2 * | 6/2008 | Akiyama | 359/649 |

FOREIGN PATENT DOCUMENTS

| | | |
|---|---|---|
| JP | 05-100311 | 4/1993 |
| JP | 2003-279888 | 10/2003 |

* cited by examiner

*Primary Examiner* — Seung C Sohn
(74) *Attorney, Agent, or Firm* — AdvantEdge Law Group, LLC (57) ABSTRACT

A reduced product height/thickness projector includes an illuminator, an electro-optic modulator, a projection system, a collector lens, and associated housing. The illuminator including a light source that emits an illumination light flux, a first lens array having a plurality of first lenslets that divide the illumination light flux from the light source into a plurality of sub-light fluxes, a second lens array having a plurality of second lenslets corresponding to the plurality of first lenslets, and a superimposing lens that superimposes the sub-light fluxes from the second lens array on an illuminated area. The central axis of the image formation area of the electro-optic modulator and the lens optical axis of the superimposing lens is shifted from the light source optical axis of the light source. The lens optical axis of the collector lens is shifted opposite from the central axis of the image formation area of the electro-optic modulator.

14 Claims, 5 Drawing Sheets

PROJECTOR

CROSS REFERENCE TO RELATED APPLICATIONS

The present application claims priority and incorporates by reference in its entirety Japanese Patent Application No. 2007-115141 filed Apr. 25, 2007.

BACKGROUND

Projectors for tilt projection as referred to in Japanese Patent Publication No. JP-A-5-100311 are known. When described with reference to a projector for tilt projection installed on a desk or the like, the light source optical axis of a light source is substantially flush with the central axis of the image formation area of an electro-optic modulator and the projection optical axis of a projection system is shifted upward from the central axis of the image formation area of the electro-optic modulator.

Despite recent increasing demand to reduce the thickness of a projector, the portion of the upper surface of the projector housing in the projector for tilt projection corresponding to the area in which a projection system is disposed and projects from includes the portion of the projector housing corresponding to the area in which other optical systems (e.g., the light source and a superimposing lens) are also disposed. As such, the height of the upper surface of the housing is relatively high, and reducing the thickness of the projector is difficult.

The thickness of the projector may not be reduced by lowering the vertical position of the projection system disposed in the housing as compared to that in related art alone, because tilt projection to the projection surface may not be performed properly by changing the vertical position of the projection system without changing the vertical positions of the other optical systems.

Dimensional design and configuration problems are not limited only to projectors for tilt projection, but similar problems occur in projectors in which the projection optical axis of the projection system is substantially flush with the central axis of the image formation area of the electro-optic modulator. For example, in a projector including a large-diameter projection lens used as the projection system, the upper end of the projection system may be higher than the upper ends of other optical systems (the light source and the superimposing lens, for example) depending on the size of the lens diameter, even when the projection optical axis of the projection system is substantially flush with the central axis of the image formation area of the electro-optic modulator. In this case as well, the resulting portion of the upper surface of the projector housing that corresponds to the area in which the projection system is disposed and projects from includes the portion corresponding to the area in which other optical systems (the light source and the superimposing lens, for example) are disposed, so that the height of the upper surface of the housing is relatively high, and hence it is not easy to reduce the thickness of the projector.

Alternatively, the height of the upper surface of the housing may not be exclusively determined by the vertical position of the projection system disposed in the housing, but rather also by the size of the light source. For example, when a relatively large reflector is used in the light source, the portion of the upper surface of the housing that corresponds to the area in which the light source is disposed and projects from includes the portion corresponding to the area in which other optical systems (the superimposing lens and the projection system, for example) are disposed, so that the height of the upper surface of the housing is relatively high, and hence it is not easy to reduce the thickness of the projector. In this case, the thickness of the projector may be reduced by reducing the size of the reflector. Unfortunately, this approach also decreases the brightness obtained by the projector.

SUMMARY

A projector has been developed in response to the current state of the art, and in particular, in response to these and other problems, needs, and demands that have not been fully or completely solved by currently available projectors. More specifically, various embodiments described in the disclosure provide a projector, having a thickness smaller than that in related art, in which the height of the upper surface of the projector may be determined by the vertical position of a projection system disposed in a housing, the size of the projection system, and/or the size of a light source.

A projector according to one embodiment includes an illuminator including a light source that emits an illumination light flux, a first lens array having a plurality of first lenslets that divide the illumination light flux from the light source into a plurality of sub-light fluxes, a second lens array having a plurality of second lenslets corresponding to the plurality of first lenslets, and a superimposing lens that superimposes the sub-light fluxes from the second lens array on an illuminated area; an electro-optic modulator that modulates the light from the illuminator according to image information; a projection system that projects the light modulated by the electro-optic modulator; a collector lens disposed on the light incident-side of the electro-optic modulator; and a housing that houses the above optical systems therein. The central axis of the image formation area of the electro-optic modulator may be shifted in a first direction from the light source optical axis of the light source. The lens optical axis of the superimposing lens may be shifted in the first direction from the light source optical axis of the light source. The lens optical axis of the collector lens may be shifted in a second direction opposite to the first direction from the central axis of the image formation area of the electro-optic modulator.

When the vertical position of the projection system disposed in the housing determines the height of the upper surface of a projector (in the case of a projector for tilt projection), in the projector according to one embodiment, since the central axis of the image formation area of the electro-optic modulator may be shifted in the first direction (for example, downward in this case) from the light source optical axis of the light source, the vertical position of the projection system disposed in the housing may be lower than a vertical position in related art while tilt projection to a projection surface may be performed properly, so that the thickness of the projector may be smaller than a thickness in related art.

When the size of the projection system disposed in the housing determines the height of the upper surface of the projector (in a projector including a large-diameter projection lens used as the projection system), in a projector according to one embodiment, since the central axis of the image formation area of the electro-optic modulator may be shifted in the first direction from the light source optical axis of the light source, the vertical position of the projection system disposed in the housing may be lower than a vertical position in related art. As a result, the thickness of the projector may be smaller than a thickness in related art.

On the other hand, when the size of the light source determines the height of the upper surface of a projector (when a relatively large reflector may be used in the light source), in the projector according to one embodiment, since the light source optical axis of the light source may be shifted in the second direction (for example, downward in this case) from the central axis of the image formation area of the electro-optic modulator, the vertical position of the light source disposed in the housing may be lower than a vertical position in related art. As a result, the thickness of the projector may be smaller than a thickness in related art without reducing the size of the light source.

In a projector in which the central axis of the image formation area of the electro-optic modulator may be shifted in the first direction from the light source optical axis of the light source, if the lens optical axis of the superimposing lens may be substantially flush with the light source optical axis of the light source, the image formation area may not be properly irradiated with the light from the superimposing lens, so that the irradiated area may be undesirably shifted in the second direction (for example, upward or downward in this case).

In contrast, in the projector according to one embodiment, since the lens optical axis of the superimposing lens may be shifted in the first direction (for example, downward or upward in this case) from the light source optical axis of the light source, it may be possible to prevent the shift of the light with which the image formation area may be irradiated, so that the image formation area can be properly irradiated with the light from the superimposing lens.

Further, in the projector according to one embodiment, since the central axis of the image formation area of the electro-optic modulator and the lens optical axis of the superimposing lens are shifted in the first direction (for example, upward or downward in this case) from the light source optical axis of the light source, whereas the lens optical axis of the collector lens may be shifted in the second direction from the central axis of the image formation area of the electro-optic modulator, the light from the superimposing lens may be angularly displaced to be incident on the image formation area substantially at right angles. As a result, the image quality of a projected image may be improved.

In the projector according to one embodiment, it may be preferable that the housing includes legs disposed on the first direction-side surface of the housing, the legs supporting the housing, and a projection provided at the portion of the first direction-side surface of the housing that corresponds to the area in which the projection system may be disposed, the projection projecting on the first direction side. The projecting height of the projection may be lower than the height of the legs.

When the vertical position of the projection system disposed in the housing determines the height of the upper surface of the housing and a cooler and other members are disposed under the projection system, lowering the vertical position of the projection system disposed in the housing as compared to a vertical position in related art may lower the height of the upper surface of the housing (for example, the height of the second direction-side surface), but may lead to the situation where the portion of the lower surface of the housing (for example, the first direction-side surface) that corresponds to the area in which the projection system may be disposed and projects from includes the portion corresponding to the area in which other optical systems (the light source and the superimposing lens, for example). In this case, the distance from the bottom surface of the housing to the top surface of the housing may not greatly differ from the distance in a projector of related art.

However, in the projector according to one embodiment, since the space created by the legs accommodates the projection, the distance from the surface on which the projector may be installed to the top surface of the housing may be smaller than the distance in a projector of related art including legs. That is, in the projector according to one embodiment, even when a cooler and other members are disposed under the projection system, the product height (product thickness) of the projector in use may be reduced.

As in the case described above, when the size of the projection system disposed in the housing determines the height of the upper surface of the housing and a cooler and other members are disposed under the projection system, the fact that the space created by the legs accommodates the projection may reduce the product height (product thickness) of the projector in use.

In the projector according to one embodiment, it may be preferable that the housing includes legs disposed on the second direction-side surface of the housing, the legs supporting the housing, and a projection provided at the portion of the second direction-side surface of the housing that corresponds to the area in which the light source may be disposed, the projection projecting on the second direction side. The projecting height of the projection may be lower than the height of the legs.

When the size of the light source determines the height of the upper surface of the housing, lowering the vertical position of the light source disposed in the housing as compared to a vertical position in related art may lower the height of the upper surface of the housing (for example, the height of the first direction-side surface), but may lead to the situation where the portion of the lower surface of the housing (for example, the second direction-side surface) that corresponds to the area in which the light source may be disposed and projects from includes the portion corresponding to the area in which other optical systems (the projection system, for example). In this case, the distance from the bottom surface of the housing to the top surface of the housing may not greatly differ from the distance in a projector of related art.

However, in the projector according to one embodiment, since the space created by the legs accommodates the projection, the distance from the surface on which the projector may be installed to the top surface of the housing may be smaller than the distance in a projector of related art including legs. That is, in the projector according to one embodiment, the product height (product thickness) of the projector in use may be reduced.

BRIEF DESCRIPTION OF THE DRAWINGS

Embodiments of the disclosure are described with reference to the accompanying drawings, wherein like reference numbers designate like elements.

DETAILED DESCRIPTION OF EXEMPLARY EMBODIMENTS

In the following detailed description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure may defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a", "van", "one", and "the" may include reference to both the singular and the plural. Reference in the specification to "one embodiment" or "an embodiment" means that a particular feature, structure, or characteristic described in connection with the embodiment may be included in at least one embodiment of the disclosure. The meaning of "in" may include "in" and "on." The appearances of the phrases "in one embodiment" or "in an embodiment" in various places in the specification do not necessarily all refer to the same embodiment, but it may. The terms "comprising", "having", and "including" should be considered synonymous, unless context dictates otherwise. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional. The use of any of these phrases does not imply or indicate that the particular feature, structure, or characteristic being described is a necessary component for every embodiment for which such a description is included.

Various embodiments of the projector of the disclosure will be described below with reference to the embodiments shown in the figures. Many of the following embodiments will be described by assuming that the projector may be positioned/installed on a desk or the like. Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment.

Relative Thickness/Height Determined by Vertical Positioning

One embodiment determines the height of the upper surface of the projector according to the vertical position of a projection system disposed in a housing. In various embodiments, a "first direction" is oriented downward, and a "second direction" is oriented upward.

The configuration of the projector according to at least one embodiment will be described with reference to FIGS. 1 and 2.

Figure 1:
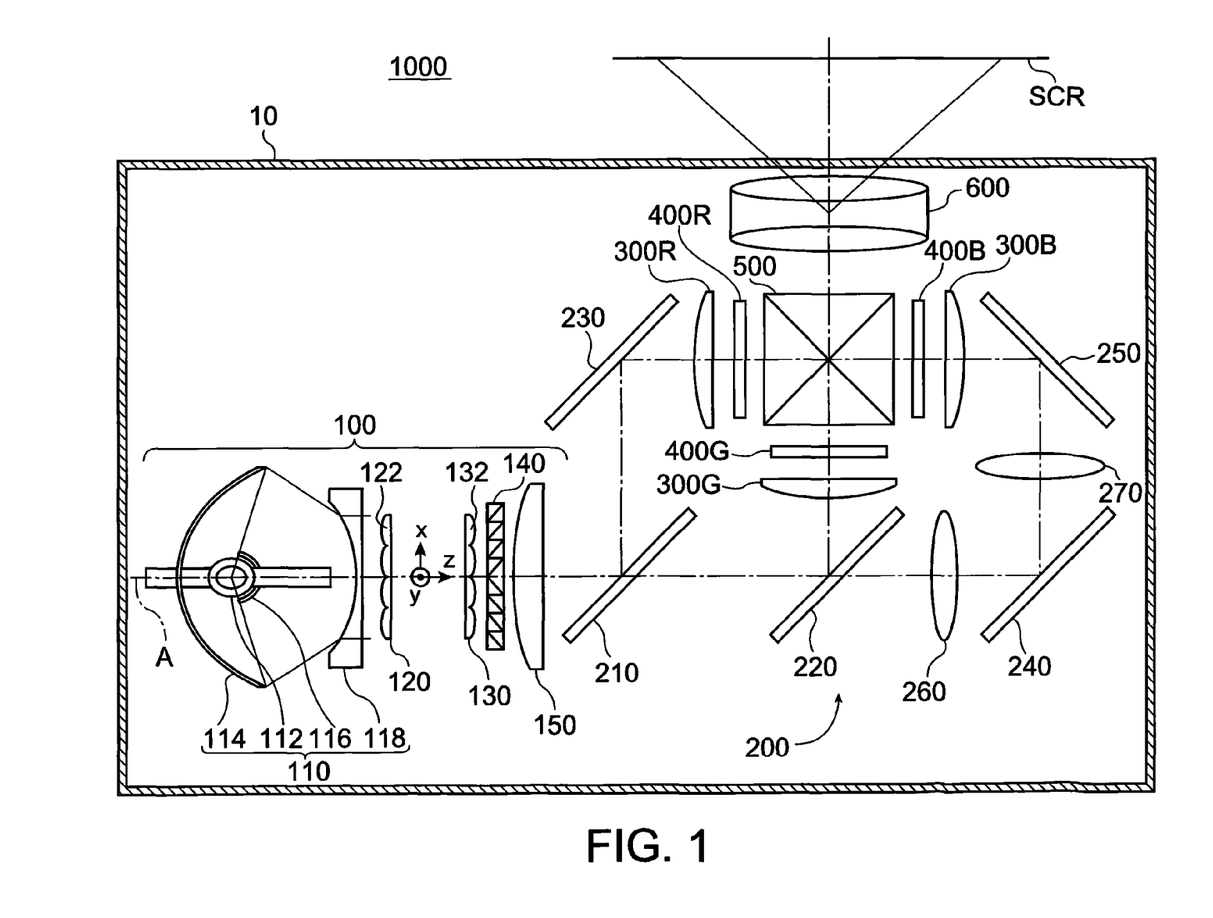
FIG. 1 is a top view of a projector 1000 according to one embodiment of the present disclosure.

FIG. 1 is a top view of the projector 1000 according to at least one embodiment. FIG. 2 explains the projector 1000 according to at least one embodiment. FIG. 2 diagrammatically shows the interior of the projector 1000 and the shape of a housing 10 when the projector 1000 is viewed from the side opposite to a screen SCR (the back side of the projector 1000), but does not show a color separation/light guiding system 200.

In the following description, the three directions perpendicular to one another are called the z-axis direction (the light source optical axis direction A in FIG. 1), the x-axis direction (the direction parallel to the plane of view and perpendicular to the z axis in FIG. 1), and the y-axis direction (the direction normal to the plane of view and perpendicular to the z axis in FIG. 1).

The projector 1000 according to at least one embodiment may be a projector for tilt projection and includes, as shown in FIG. 1, an illuminator 100, a color separation/light guiding system 200 that separates the illumination light flux from the illuminator 100 into red, green, and blue three color light beams and guides these light beams to the areas to be illuminated, three liquid crystal devices 400R, 400G, and 400B as electro-optic modulators that modulate, according to image information, the respective three color light beams separated by the color separation/light guiding system 200, collector lenses 300R, 300G, and 300B disposed on the light incident-side of the liquid crystal devices 400R, 400G, and 400B, a cross dichroic prism 500 that combines the color light beams modulated by the liquid crystal devices 400R, 400G, and 400B, a projection system 600 that projects the light combined in the cross dichroic prism 500 onto the screen SCR or the like, and the housing 10 that houses the above optical systems therein. A cooler 700 that cools optical elements, such as the liquid crystal devices 400R, 400G, and 400B, may be disposed under the cross dichroic prism 500 and the projection system 600 (see FIG. 2).

The illuminator 100 includes a light source 110 that emits an illumination light flux toward the area to be illuminated, a first lens array 120 having a plurality of first lenslets 122 that divide the illumination light flux emitted from the light source 110 into a plurality of sub-light fluxes, a second lens array 130 having a plurality of second lenslets corresponding to the plurality of first lenslets 122 in the first lens array 120, a polarization conversion element 140 that converts the sub-light fluxes from the second lens array into substantially one type of linearly polarized sub-light fluxes having an aligned polarization direction and outputs the linearly polarized sub-light fluxes, and a superimposing lens that superimposes the sub-light fluxes outputted from the polarization conversion element 140 on the illuminated area.

The light source 110 includes an ellipsoidal reflector 114, an arc tube 112, the emission center of which may be located in the vicinity of the first focal point of the ellipsoidal reflector 114, a sub-mirror 116 that reflects the light emitted from the arc tube 112 toward the area to be illuminated back toward the arc tube 112, and a concave lens 118 that outputs the converging light from the ellipsoidal reflector 114 as substantially parallel light. The light source 110 emits a light flux having the light source optical axis A as the central axis.

The arc tube 112 includes a lamp body and a pair of sealed portions, each extending toward an end of the lamp body. The lamp body may be made of quartz glass and shaped into a spherical form. The lamp body includes a pair of electrodes disposed in the lamp body and mercury, a rare gas, and a trace of halogen encapsulated in the lamp body. Various arc tubes may be employed as the arc tube 112, such as a metal-halide lamp, a high-pressure mercury lamp, and an ultrahigh-pressure mercury lamp.

The ellipsoidal reflector 114 includes a tubular neck-like portion into which one of the sealed portions of the arc tube 112 may be inserted and bonded and a reflective concave surface that reflects the light emitted from the arc tube 112 toward the second focus position.

The sub-mirror 116 may be a reflector disposed in such a way that it covers approximately half of the lamp body of the arc tube 112 and faces the reflective concave surface of the ellipsoidal reflector 114. The other sealed portion of the arc tube 112 may be inserted and bonded to the sub-mirror 116. The sub-mirror 116 returns the portion of the light emitted from the arc tube 112 that may not be directed toward the ellipsoidal reflector 114 back to the arc tube 112 and onto the ellipsoidal reflector 114.

The concave lens 118 may be disposed on the illuminated area side of the ellipsoidal reflector 114 and configured to output the light from the ellipsoidal reflector 114 toward the first lens array 120.

The first lens array 120 serves as a light flux dividing optical element that divides the light from the concave lens 118 into a plurality of sub-light fluxes and includes a plurality of first lenslets 122 arranged in a matrix formed of multiple rows and multiple columns in a plane perpendicular to the light source optical axis A. Although no description may be made with reference to a figure, the outer shape of each of the first lenslets 122 may be similar to the outer shape of the image formation area of each of the liquid crystal devices 400R, 400G, and 400B.

The second lens array 130 in conjunction with the superimposing lens 150 has a function of focusing the images of the first lenslets 122 in the first lens array 120 in the vicinity of the image formation area of each of the liquid crystal devices 400R, 400G, and 400B. The second lens array 130 has substantially the same configuration as that of the first lens array 120 and includes a plurality of second lenslets 132 arranged in a matrix formed of multiple rows and multiple columns in a plane perpendicular to the light source optical axis A.

The polarization conversion element 140 converts the polarization directions of the sub-light fluxes divided by the first lens array 120 into an aligned polarization direction and outputs substantially one type of linearly polarized sub-light fluxes.

The polarization conversion element 140 includes a polarization separation layer that transmits the portion of the illumination light flux from the light source 110 that has one polarization component (P-polarized component, for example) and reflects the portion that has another polarization component (S-polarized component, for example) in the direction perpendicular to the light source optical axis A, a reflective layer that receives the light having the other polarization component that has been reflected off the polarization separation layer and reflects it in the direction parallel to the light source optical axis A, and a phase plate that converts the light having the one polarization component that has passed through the polarization separation layer into the light having the other polarization component.

The superimposing lens 150 may be an optical element that collects the plurality of sub-light fluxes that have passed through the first lens array 120, the second lens array 130, and the polarization conversion element 140 and superimposes the sub-light fluxes in the vicinity of the image formation area of each of the liquid crystal devices 400R, 400G, and 400B. The superimposing lens 150 may be a compound lens formed of a combination of a plurality of lenses.

The color separation/light guiding system 200 includes dichroic mirrors 210 and 220, reflective mirrors 230, 240, and 250, a light incident-side lens 260, and a relay lens 270. The color separation/light guiding system 200 has a function of separating the illumination light flux that has exited from the superimposing lens 150 into red, green, and blue three color light beams and guiding the color light beams to the respective three liquid crystal devices 400R, 400G, and 400B to be illuminated.

The liquid crystal devices 400R, 400G, and 400B are illuminated with the illuminator 100 and modulate the illumination light flux according to image information.

Each of the liquid crystal devices 400R, 400G, and 400B seals and encapsulates liquid crystal molecules, electro-optic material, between a pair of transparent glass substrates. For example, a polysilicon TFT may be used as a switching element to modulate the polarization direction of the one type of linearly polarized light that has exited from a light incident-side polarizer plate, which will be described later, according to the provided image information.

The collector lenses 300R, 300G, and 300B are disposed upstream of the liquid crystal devices 400R, 400G, and 400B in the light path.

Although not illustrated, light incident-side polarizer plates are interposed between the collector lenses 300R, 300G, 300B and the liquid crystal devices 400R, 400G, 400B, and light exit-side polarizer plates are interposed between the liquid crystal devices 400R, 400G, 400B and the cross dichroic prism 500. The light incident-side polarizer plates, the liquid crystal devices 400R, 400G, and 400B, and the light exit-side polarizer plates modulate the respective incident color light beams.

The cross dichroic prism 500 may be an optical element that combines the modulated optical images for respective color light beams that have exited from the light exit-side polarizer plates and forms a color image. The cross dichroic prism 500 may be formed by bonding four rectangular prisms and thus has a substantially square shape when viewed from the top. Dielectric multilayer films are formed along the substantially X-shaped interfaces between these bonded rectangular prisms. The dielectric multilayer film formed on one of the substantially X-shaped interfaces reflects the red light, whereas the dielectric multilayer film formed on the other interface reflects the blue light. These dielectric multilayer films bend the red light and the blue light, which then travel in the same direction as the green light, so that the three color light beams are combined.

The color image outputted from the cross dichroic prism 500 may be enlarged and projected through the projection system 600, and forms a large-screen image on the screen SCR.

Figure 2:
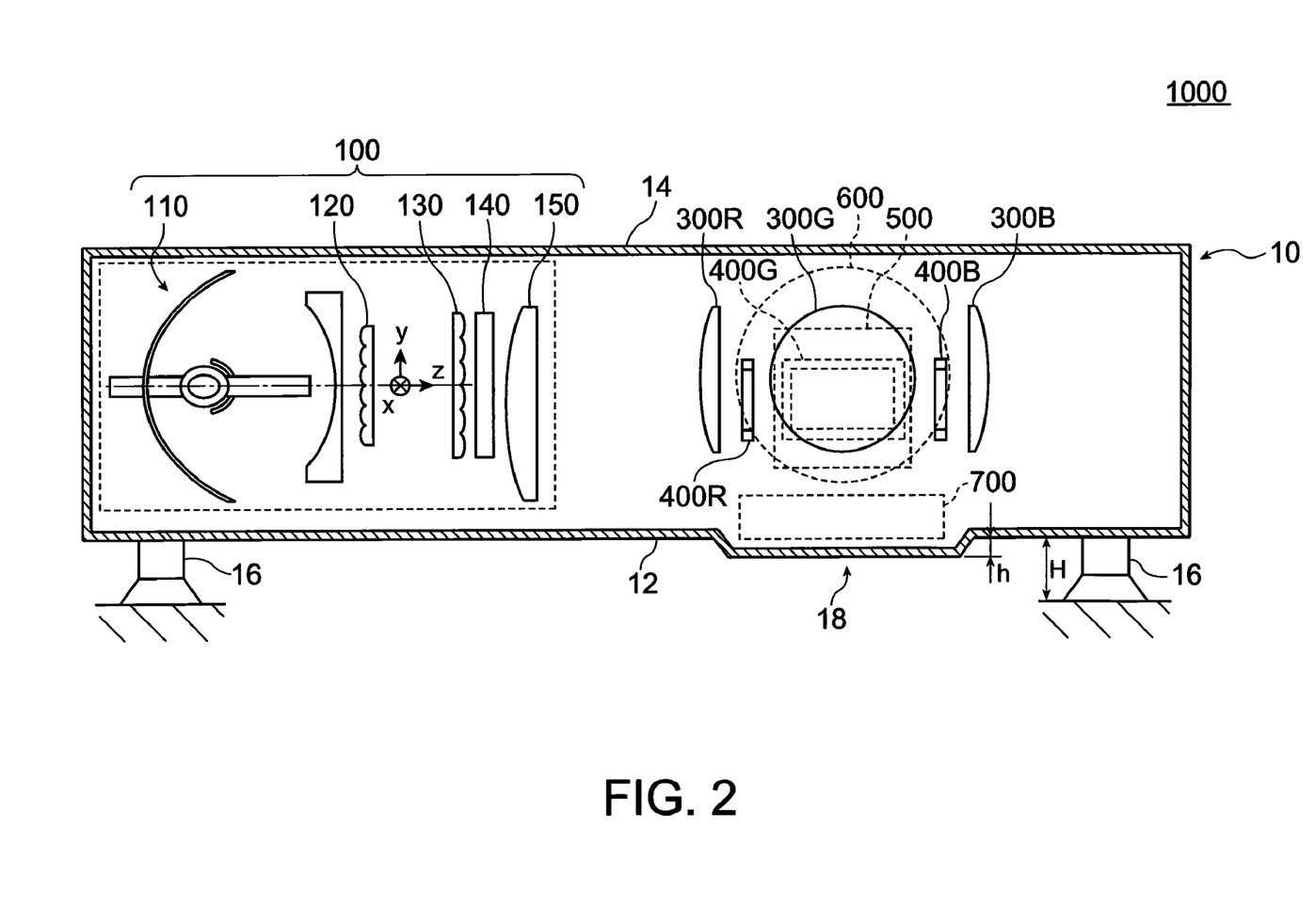
FIG. 2 is a schematic view showing the projector 1000 according to one embodiment of the present disclosure.

The housing 10 includes legs 16 and a projection 18 as shown in FIG. 2. The legs 16 are disposed on the bottom (lower side) 12 of the housing 10 and support the housing 10. The projection 18 may be provided at part of the bottom 12 of the housing 10.

The legs 16 are disposed on the bottom of the housing 10, for example, one for each of the four corners of the bottom, four in total (only two legs 16 are illustrated in FIG. 2). Each of the legs 16 may include an adjustment mechanism for adjusting the height of the leg 16 (the height of the projector 1000).

The projection 18 may be disposed at the portion of the bottom 12 of the housing 10 that corresponds to the area in which the projection system 600 (and the cross dichroic prism 500) may be disposed (see FIG. 3B, which will be described later), and projects downward (in the y(−) direction). The projecting height, h, of the projection 18 may be set to be lower than the height, H, of the leg 16 (that is, set to satisfy "h<H").

The projector 1000 according to at least one embodiment will be described in more detail by describing a projector 1000a according to a comparative example of at least one embodiment.

Figure 3A:
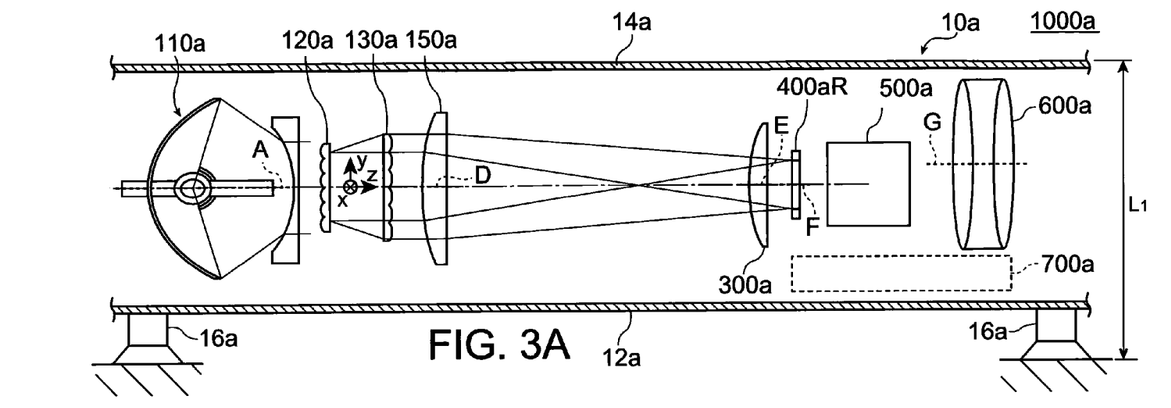
FIGS. 3A and 3B are schematic views showing the projector 1000 according to at least one embodiment of the present disclosure.
Figure 3B:
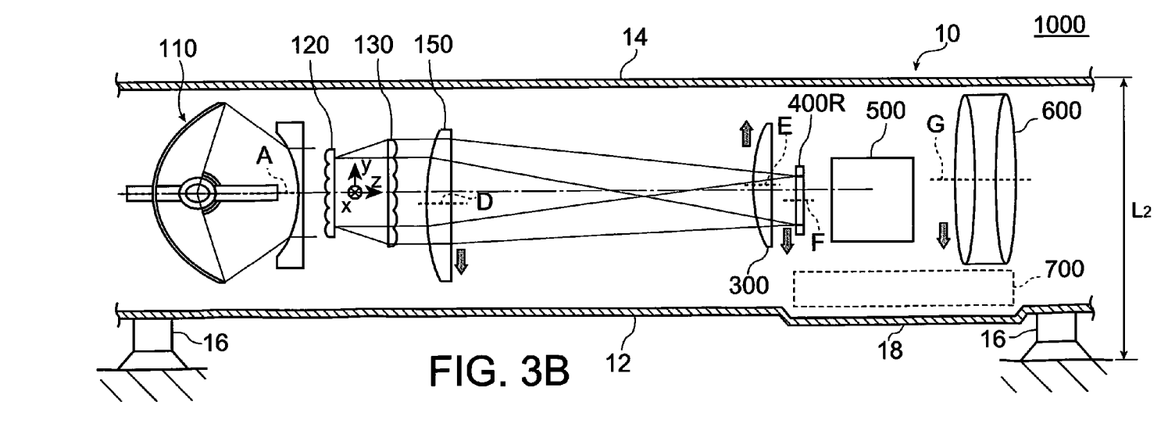

FIGS. 3A and 3B explain the projector 1000 according to at least one embodiment. FIG. 3A is a side view of the projector 1000a according to the comparative example, and FIG. 3B is a side view of the projector 1000 according to at least one embodiment. To simplify the description, FIGS. 3A and 3B show the optical system disposed in the light path for the red light among the three colors, but do not show the polarization conversion element 140 and the color separation/light guiding system 200.

In the projector 1000a according to the comparative example, as shown in FIG. 3A, the optical systems ranging from a light source 110a to a cross dichroic prism 500a are disposed in such a way that the light source optical axis A of the light source 110a, the lens optical axis D of a superimposing lens 150a, the lens optical axis E of a collector lens 300aR, and the central axis F of the image formation area of a liquid crystal device 400aR are substantially flush with one another. A projection system 600a may be disposed in such a way that the projection optical axis G of the projection system 600a may be shifted upward (in the y(+) direction) in the second direction from the central axis F of the image formation area of the liquid crystal device 400aR.

Therefore, in the projector 1000a according to the comparative example, since the light source optical axis A of the light source 110a may be substantially flush with the central axis F of the image formation area of the liquid crystal device 400aR, and the projection optical axis G of the projection system 600a may be shifted upward from the central axis F of the image formation area of the liquid crystal device 400aR, upward tilt projection may be performed.

However, in the projector 1000a according to the comparative example, the portion of the upper surface 14a of a housing 10a that corresponds to the area in which the projection system 600a may be disposed and projects from includes the portion corresponding to the area in which other optical systems (the light source 110a and the superimposing lens 150a, for example) are disposed, so that the height of the upper surface of the housing 10a may be relatively high, and hence it may not be easy to reduce the thickness of the projector 1000a.

In this case, it may be conceivable to reduce the thickness of the projector 1000a by lowering the vertical position of the projection system 600a as compared to that in related art. However, changing the vertical position of the projection system 600a without changing the vertical positions of the light source 110a, the superimposing lens 150a and the like may not be preferable because tilt projection to the screen may not be performed properly.

In contrast, as shown in FIG. 3B, the projector 1000 according to at least one embodiment may be the same as the projector 1000a according to the comparative example in that the projection optical axis G of the projection system 600 may be shifted upward in the second direction from the central axis F of the image formation area of the liquid crystal device 400R, but differs from the projector 1000a according to the comparative example in that the central axis F of the image formation area of the liquid crystal device 400R may be shifted downward (in the y(−) direction) in the first direction from the light source optical axis A of the light source 110, and the lens optical axis D of the superimposing lens 150 may be shifted downward in the first direction from the light source optical axis A of the light source 110, while the lens optical axis E of the collector lens 300R may be shifted upward in the second direction from the central axis F of the image formation area of the liquid crystal device 400R.

In the thus configured projector 1000 according to at least one embodiment, since the central axis F of the image formation area of the liquid crystal device 400R may be shifted downward from the light source optical axis A of the light source 110, the vertical position of the projection system 600 (and the cross dichroic prism 500) disposed in the housing 10 may be lower than a vertical position in related art while tilt projection to the screen may be performed properly, so that the thickness of the projector may be smaller than a thickness in related art.

In the projector 1000 according to at least one embodiment, since the space created by the legs 16 accommodates the projection 18, the distance $L_2$ from the surface on which the projector may be installed to the top surface of the housing 10 in the projector 1000 according to at least one embodiment may be smaller than the distance $L_1$ from the surface on which the projector may be installed to the top surface of the housing 10a in the projector 1000a according to the comparative example. That is, in the projector 1000 according to at least one embodiment, even when the cooler 700 and other members are disposed under the projection system 600, the product height (product thickness) of the projector in use may be reduced.

In a projector in which the central axis F of the image formation area of the liquid crystal device 400R may be shifted downward from the light source optical axis A of the light source 110, if the lens optical axis D of the superimposing lens 150 may be substantially flush with the light source optical axis A of the light source 110, the image formation area may not be properly irradiated with the light from the superimposing lens 150, so that the irradiated area may be undesirably shifted upward from the image formation area.

In contrast, in the projector 1000 according to at least one embodiment, since the lens optical axis D of the superimposing lens 150 may be shifted downward from the light source optical axis A of the light source 110, it may be possible to prevent the shift of the light with which the image formation area may be irradiated, so that the image formation area may be properly irradiated with the light from the superimposing lens 150.

Further, in the projector 1000 according to at least one embodiment, since the central axis F of the image formation area of the liquid crystal device 400R and the lens optical axis D of the superimposing lens 150 are shifted downward from the light source optical axis A of the light source 110, whereas the lens optical axis E of the collector lens 300R may be shifted upward from the central axis F of the image formation area of the liquid crystal device 400R, the light from the superimposing lens 150 may be angularly displaced to be incident on the image formation area substantially at right angles. As a result, the image quality of a projected image may be improved.

Relative Height/Thickness Determined by Size of Light Source

One embodiment explains the case where the size of the light source determines the height of the upper surface of the housing. In at least one embodiment, a "first direction" is oriented upward, and a "second direction" is oriented downward.

Figure 4:
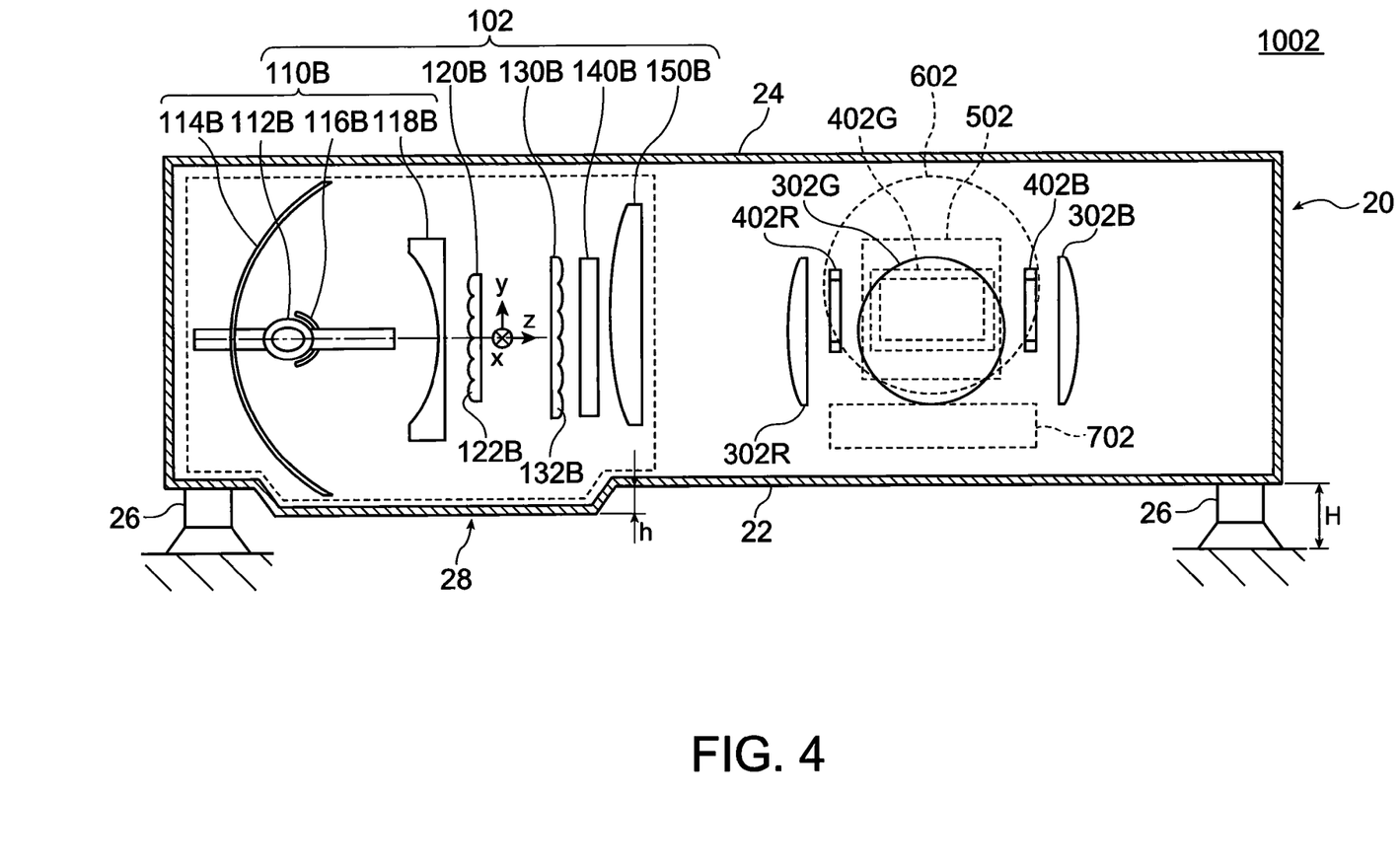
FIG. 4 is a schematic view showing a projector 1002 according to another embodiment of the present disclosure.

FIG. 4 explains a projector 1002 according to at least one embodiment. FIG. 4 diagrammatically shows the interior of the projector 1002 and the shape of a housing 20 when the projector 1002 may be viewed from the side opposite to the screen SCR (the back side of the projector 1002), but does not show a color separation/light guiding system 202.

Figure 5A:
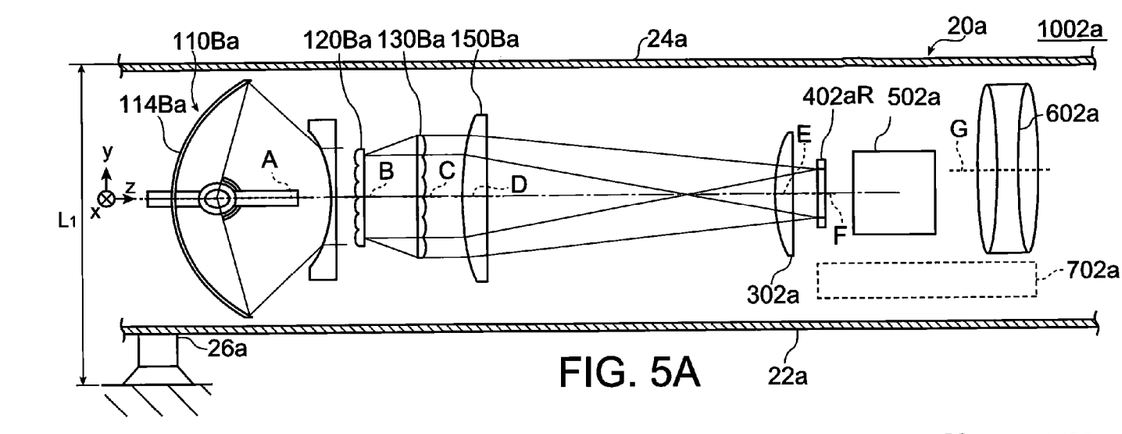
FIGS. 5A and 5B are schematic views showing the projector 1002 according to at least one embodiment of the present disclosure.
Figure 5B:
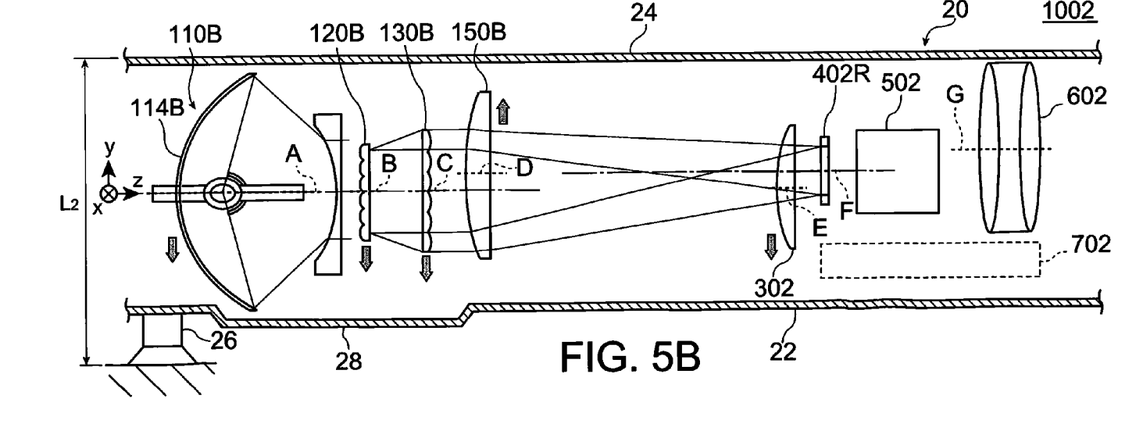

FIGS. 5A and 5B explain the projector 1002 according to at least one embodiment. FIG. 5A is a side view of a projector 1002a according to a comparative example, and FIG. 5B is a side view of the projector 1002 according to at least one embodiment. To simplify the description, FIGS. 5A and 5B show the optical system disposed in the light path for the red light among the three colors, but do not show the polarization conversion element and the color separation/light guiding system.

The projector 1002 according to at least one embodiment may be a projector for tilt projection and includes, as shown in FIG. 4 and FIGS. 5A and 5B, an illuminator 102, a color separation/light guiding system 202 (not shown) that separates the illumination light flux from the illuminator 102 into red, green, and blue three color light beams and guides these light beams to the areas to be illuminated, three liquid crystal devices 402R, 402G, and 402B that modulate, according to image information, the respective three color light beams separated by the color separation/light guiding system 202, collector lenses 302R, 302G, and 302B disposed on the light incident-side of the liquid crystal devices 402R, 402G, and 402B (FIG. 4 shows only the liquid crystal devices 402R, 402B and the collector lenses 302R, 302B), a cross dichroic prism 502 that combines the color light beams modulated by the liquid crystal devices 402R, 402G, and 402B, a projection system 602 that projects the light combined in the cross dichroic prism 502 onto the screen SCR or the like, and the housing 20 that houses the above optical systems therein. A cooler 702 that cools optical elements, such as the liquid crystal devices 402R, 402G, and 402B, may be disposed under the cross dichroic prism 502 and the projection system 602.

The illuminator 102 includes a light source 110B that emits an illumination light flux toward the area to be illuminated, a first lens array 120B having a plurality of first lenslets 122B that divide the illumination light flux emitted from the light source 110B into a plurality of sub-light fluxes, a second lens array 130B having a plurality of second lenslets 132B corresponding to the plurality of first lenslets 122B in the first lens array 120B, a polarization conversion element 140B that converts the sub-light fluxes from the second lens array 130B into substantially one type of linearly polarized sub-light fluxes having an aligned polarization direction and outputs the linearly polarized sub-light fluxes, and a superimposing lens 150B that superimposes the sub-light fluxes outputted from the polarization conversion element 140B on the illuminated area.

The light source 110B, the first lens array 120B, the second lens array 130B, the polarization conversion element 140B, and the superimposing lens 150B are configured in substantially the same way as previously described in at least one embodiment. Detailed description thereof may therefore be omitted.

The color separation/light guiding system 202, the liquid crystal devices 402R, 402G, and 402B, the collector lenses 302R, 302G, and 302B, the cross dichroic prism 502, and the projection system 602 are also configured in substantially the same way as previously described in at least one embodiment. Detailed description thereof may therefore be omitted.

The housing 20 includes legs 26 and a projection 28 as shown in FIG. 4. The legs 26 are disposed on the bottom (lower side) 22 of the housing 20 and support the housing 20. The projection 28 may be provided at part of the bottom 22 of the housing 20.

The legs 26 are disposed on the bottom of the housing 20, for example, one for each of the four corners of the bottom, four in total (only two legs 26 are illustrated in FIG. 4). Each of the legs 26 may include an adjustment mechanism for adjusting the height of the leg 26 (the height of the projector 1002).

The projection 28 may be disposed at the portion of the bottom 22 of the housing 20 that corresponds to the area in which the light source 110B may be disposed, and projects downward (in the y(−) direction). The projecting height, h, of the projection 28 may be set to be lower than the height, H, of the leg 26 (that is, set to satisfy "h<H").

The projector 1002 according to at least one embodiment will be described in more detail by describing the projector 1002a according to the comparative example of at least one embodiment.

In the projector 1002a according to the comparative example, as shown in FIG. 5A, the optical systems ranging from a light source 110Ba to a cross dichroic prism 502a are disposed in such a way that the light source optical axis A of the light source 110Ba, the lens optical axis D of a superimposing lens 150Ba, the lens optical axis E of a collector lens 302aR, and the central axis F of the image formation area of a liquid crystal device 402aR are substantially flush with one another. A projection system 602a may be disposed in such a way that the projection optical axis G of the projection system 602a may be shifted upward (in the y(+) direction) in the first direction from the central axis F of the image formation area of the liquid crystal device 402aR.

Therefore, in the projector 1002a according to the comparative example, since the light source optical axis A of the light source 110Ba may be substantially flush with the central axis F of the image formation area of the liquid crystal device 402aR, and the projection optical axis G of the projection system 602a may be shifted upward from the central axis F of the image formation area of the liquid crystal device 402aR, upward tilt projection may be performed.

However, in the projector 1002a according to the comparative example, the portion of the upper surface 24a of a housing 20a that corresponds to the area in which the light source 110Ba may be disposed and projects from includes the portion corresponding to the area in which other optical systems (the superimposing lens 150Ba and the projection system 602a, for example) are disposed, so that the height of the upper surface of the housing 20a may be relatively high, and hence it may not be easy to reduce the thickness of the projector 1002a.

In this case, it may be conceivable to reduce the thickness of the projector 1002a by reducing the size of an ellipsoidal reflector 114Ba. However, this approach may not be preferable because the brightness obtained by the projector 1002a decreases.

In contrast, as shown in FIG. 5B, the projector 1002 according to at least one embodiment may be the same as the projector 1002a according to the comparative example in that the projection optical axis G of the projection system 602 may be shifted upward from the central axis F of the image formation area of the liquid crystal device 402R, but differs from the projector 1002a according to the comparative example in that the light source optical axis A of the light source 110B, the central axis B of the first lens array 120B, and the central axis C of the second lens array 130B are shifted downward (in the y(−) direction) in the second direction from the central axis F of the image formation area of the liquid crystal device 402R, and the lens optical axis E of the collector lens 302R may be shifted downward in the second direction from the central axis F of the image formation area of the liquid crystal device 402R, whereas the lens optical axis D of the superimposing lens 150B may be shifted upward in the first direction from the light source optical axis A of the light source 110B.

It may be noted that the central axis B of the first lens array 120B means the lens optical axis of the first lens array 120B when it may be regarded as one lens, and the central axis C of the second lens array 130B means the lens optical axis of the second lens array when it may be regarded as one lens.

In the thus configured projector 1002 according to at least one embodiment, since the light source optical axis A of the light source 110B, the central axis B of the first lens array 120B, and the central axis C of the second lens array 130B are shifted downward from the central axis F of the image formation area of the liquid crystal device 402R, the vertical position of the light source 110B disposed in the housing 20 may be lower than a vertical position in related art. As a result, the thickness of the projector may be smaller than a thickness in related art without reducing the size of the ellipsoidal reflector 114B in the light source 110B.

In the projector 1002 according to at least one embodiment, since the space created by the legs 26 accommodates the projection 28, the distance $L_2$ from the surface on which the projector may be installed to the top surface of the housing 20 in the projector 1002 according to at least one embodiment may be smaller than the distance $L_1$ from the surface on which the projector may be installed to the top surface of the housing 20a in the projector 1002a according to the comparative example. That is, in the projector 1002 according to at least one embodiment, the product height (product thickness) of the projector in use may be reduced.

In a projector in which the light source optical axis A of the light source 110B, the central axis B of the first lens array 120B, and the central axis C of the second lens array 130B are shifted downward from the central axis F of the image formation area of the liquid crystal device 402R, if the lens optical axis D of the superimposing lens 150B may be substantially flush with the light source optical axis A of the light source 110B, the image formation area may not be properly irradiated with the light from the superimposing lens 150B, so that the irradiated area may be undesirably shifted downward.

In contrast, in the projector 1002 according to at least one embodiment, since the lens optical axis D of the superimposing lens 150B may be shifted upward from the light source optical axis A of the light source 110B, it may be possible to prevent the shift of the light with which the image formation area may be irradiated, so that the image formation area may be properly irradiated with the light from the superimposing lens 150B.

Further, in the projector 1002 according to at least one embodiment, since the light source optical axis A of the light source 110B, the central axis B of the first lens array 120B, and the central axis C of the second lens array 130B are shifted downward from the central axis F of the image formation area of the liquid crystal device 402R, and the lens optical axis E of the collector lens 302R may be shifted downward from the central axis F of the image formation area of the liquid crystal device 402R, whereas the lens optical axis D of the superimposing lens 150B may be shifted upward from the light source optical axis A of the light source 110B, the light from the superimposing lens 150B may be angularly displaced to be incident on the image formation area substantially at right angles. As a result, the image quality of a projected image may be improved.

While the projector of the disclosure has been described with reference to the above embodiments, the disclosure may not be limited thereto, but may be implemented in various aspects to the extent that they do not depart from the spirit of the disclosure. This application is intended to cover any adaptations or variations of the embodiments discussed herein. Therefore, it may be manifestly intended that embodiments in accordance with the present disclosure be limited only by the claims and the equivalents thereof. For example, the following seven variations of the illustrated embodiments are possible and should be considered within the scope of the disclosure.

(1) In the projector 1000 according to at least one embodiment, the case where the vertical position of the projection system disposed in the housing determines the height of the upper surface of the projector has been described with reference to the configuration in which the projection optical axis G of the projection system 600 may be shifted upward from the central axis F of the image formation area of the liquid crystal device 400R and the cooler 700 and other members are disposed under the projection system 600. The above configuration has been presented by way of example, and the disclosure may not be limited thereto. The same approach as that used in at least one embodiment may be applicable to, for example, the following cases: (a) the projection optical axis of the projection system may be substantially flush with the central axis of the image formation area of the liquid crystal device, but the upper end of the projection system may be higher than the upper end of any of other optical systems because the lens diameter of the projection system may be large, that is, the size of the projection system disposed in the housing determines the height of the upper surface of the projector, and (b) the projector includes a lens shift mechanism that may adjust as appropriate the vertical position of the projection optical axis of the projection system relative to the central axis of the image formation area of the liquid crystal device, and the upper end of the projection system that has become higher than the upper end of any of other optical systems as a result of manipulating the lens shift mechanism determines the height of the upper surface of the projector. That is, the product height (product thickness) of the projector may be reduced by combining any of the above variations with the configuration in which the central axis of the image formation area of the liquid crystal device may be shifted downward (in the y(−) direction) from the light source optical axis of the light source, and the lens optical axis of the superimposing lens may be shifted downward from the light source optical axis of the light source, whereas the lens optical axis of the collector lens may be shifted upward from the central axis of the image formation area of the liquid crystal device.

(2) In the projectors 1000 and 1002 according to various embodiments, the light source includes an ellipsoidal reflector, but the disclosure may not be limited thereto. It may also be preferable that the light source includes a parabolic reflector. In this case, no concave lens may be required.

(3) Although the projectors 1000 and 1002 according to various embodiments are transmission projectors, the disclosure may not be limited thereto. The disclosure may be also applicable to a reflection projector. The word "transmission" used herein means that the electro-optic modulator as the light modulator may be of a light-transmission type, such as a transmissive liquid crystal device, and the word "reflection" used herein means that the electro-optic modulator as the light modulator may be of a light-reflection type, such as a reflective liquid crystal device. When the disclosure may be applied to a reflection projector as well, the same advantage as that provided in a transmission projector may be provided.

(4) In the projectors 1000 and 1002 according to various embodiments, although the description has been made with reference to a projector using three liquid crystal devices, the disclosure may not be limited thereto. The disclosure may also be applicable to a projector using one liquid crystal device, a projector using two liquid crystal devices, and a projector using four or more liquid crystal devices.

(5) In the projectors 1000 and 1002 according to various embodiments, although a liquid crystal device may be used as the electro-optic modulator, the disclosure may not be limited thereto. In general, the electro-optic modulator may be any other device that modulates the incident light according to image information, such as a micromirror light modulator. For example, a DMD (Digital Micromirror Device: a trademark of Texas Instruments) may be used as the micromirror light modulator.

(6) The disclosure may be applicable to not only a front projection projector that projects a projection image from the observation side but also a rear projection projector that projects a projection image from the side opposite to the observation side.

(7) The disclosure may be applicable to not only a projector installed on a desk or the like (desktop projector) but also a projector hanging from the ceiling or the like (ceiling-hanging projector).

What is claimed is:

1. A projector comprising:
    an illuminator including a light source configured to emit an illumination light flux, a first lens array having a plurality of first lenslets configured to divide the illumination light flux from the light source into a plurality of sub-light fluxes, a second lens array having a plurality of second lenslets corresponding to the plurality of first lenslets, and a superimposing lens configured to superimpose the sub-light fluxes from the second lens array on an illuminated area;
    an electro-optic modulator configured to modulate light from the illuminator according to image information;
    a projection system configured to project the light modulated by the electro-optic modulator;
    a collector lens disposed on a light incident-side of the electro-optic modulator; and
    a housing configured to house optical systems including the illuminator, the electro-optic modulator, the projection system, and the collector lens therein,
    wherein a central axis of an image formation area of the electro-optic modulator shifts in a first direction from a light source optical axis of the light source, a lens optical axis of the superimposing lens shifts in the first direction from the light source optical axis of the light source, and a lens optical axis of the collector lens shifts in a second direction opposite to the first direction from the central axis of the image formation area of the electro-optic modulator.

2. The projector according to claim 1, wherein the housing includes legs disposed on a first direction-side surface of the housing, the legs supporting the housing, and a projection provided at the portion of the first direction-side surface of the housing corresponding to the area in which the projection system is disposed, the projection projecting on the first direction-side, and the projecting height of the projection is lower than the height of the legs.

3. The projector according to claim 1, wherein the housing includes legs disposed on a second direction-side surface of the housing, the legs supporting the housing, and a projection provided at the portion of the second direction-side surface of the housing corresponding to the area in which the light source is disposed, the projection projecting on the second direction-side, and the projecting height of the projection is lower than the height of the legs.

4. A reduced product height/thickness projector comprising:
    an illuminator including a light source configured to emit an illumination light flux, a first lens array having a plurality of first lenslets configured to divide the illumination light flux from the light source into a plurality of sub-light fluxes, a second lens array having a plurality of second lenslets corresponding to the plurality of first lenslets, and a superimposing lens configured to superimpose the sub-light fluxes from the second lens array on an illuminated area, the superimposing lens having a lens optical axis shifted in a first direction from a light source optical axis of the light source;
    an electro-optic modulator configured to modulate light from the illuminator according to image information, a central axis of an image formation area of the electro-optic modulator is shifted in the first direction from the light source optical axis of the light source;
    a projection system configured to project the light modulated by the electro-optic modulator;
    a collector lens disposed on a light incident-side of the electro-optic modulator, a lens optical axis of the collector lens shifted in a second direction opposite to the first direction from the central axis of the image formation area of the electro-optic modulator; and
    a housing configured to house the illuminator, the electro-optic modulator, the projection system, and the collector lens therein.

5. The projector according to claim 4, wherein the light source includes an ellipsoidal reflector.

6. The projector according to claim 4, wherein the reduced product height/thickness projector is a transmission projector.

7. The projector according to claim 4, wherein the electro-optic modulator includes at least one liquid crystal device.

8. The projector according to claim 7, further comprising a lens shift mechanism configured to adjust the vertical position of the projection optical axis of the projection system relative to the central axis of the image formation area of the liquid crystal device.

9. The projector according to claim 4, wherein the electro-optic modulator is a micromirror light modulator.

10. The projector according to claim 4, wherein the projector is a front projection projector configured to project a projection image from an observation side.

11. The projector according to claim 4, wherein the projector is one of a desktop projector and/or a ceiling-hanging projector.

12. A method to reduce product thickness/height of a projection system, comprising:
    shifting a central axis of an image formation area of a liquid crystal device of the projection system downward relative to a light source optical axis of a light source of the projection system;
    shifting a lens optical axis of a superimposing lens of the projection system downward relative to the light source optical axis of the light source of the projection system; and
    shifting a lens optical axis of a collector lens of the projection system upward relative to the central axis of the image formation area of the liquid crystal device of the projection system.

13. The method as recited in claim 12, wherein the shifting downwards is conducted in the y(−) direction.

14. The method as recited in claim 12, wherein the shifting is performed by a lens shift mechanism configured to adjust position of a projection optical axis of the projection system relative to the central axis of the image formation area.

* * * * *